United States Patent Office

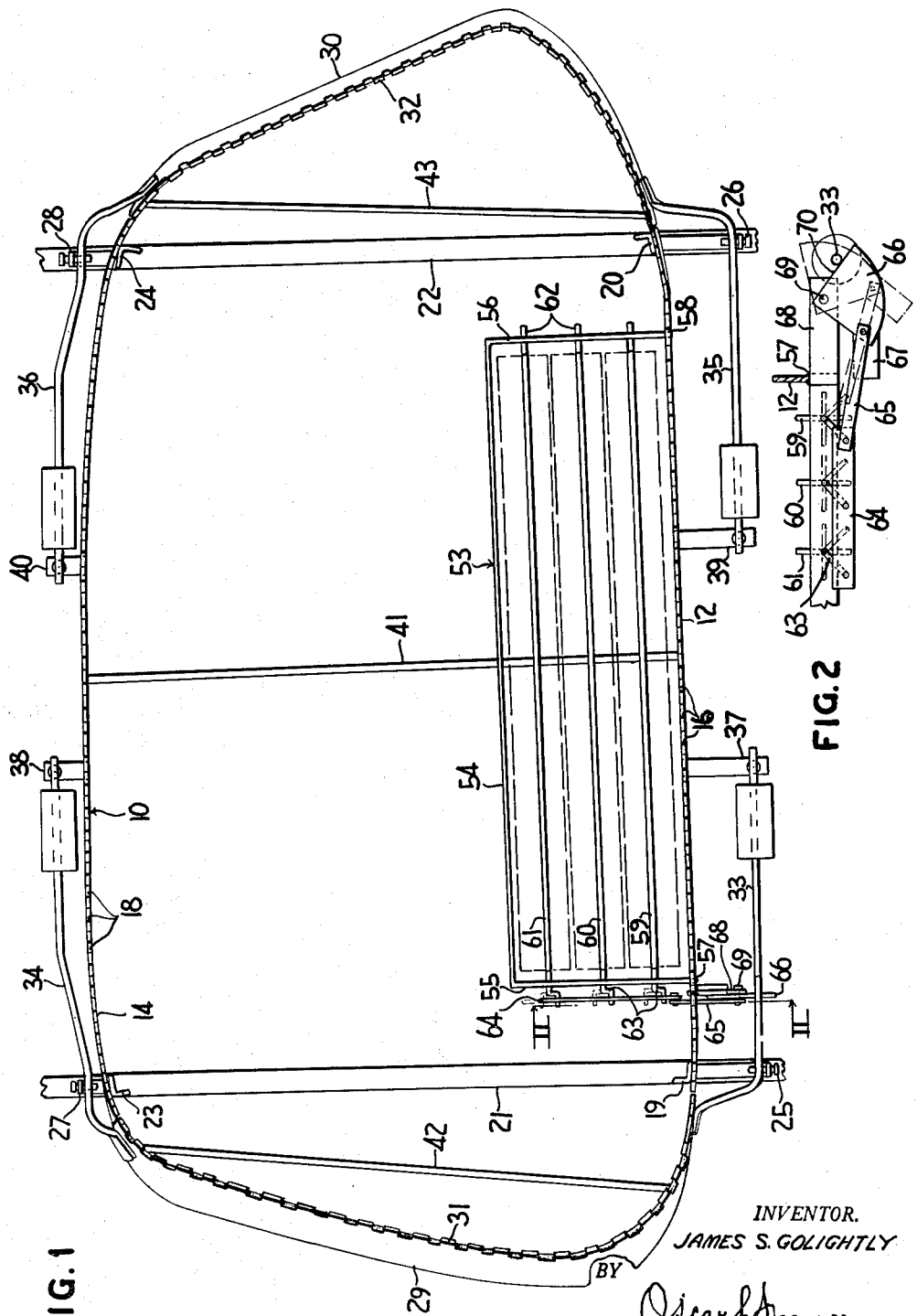

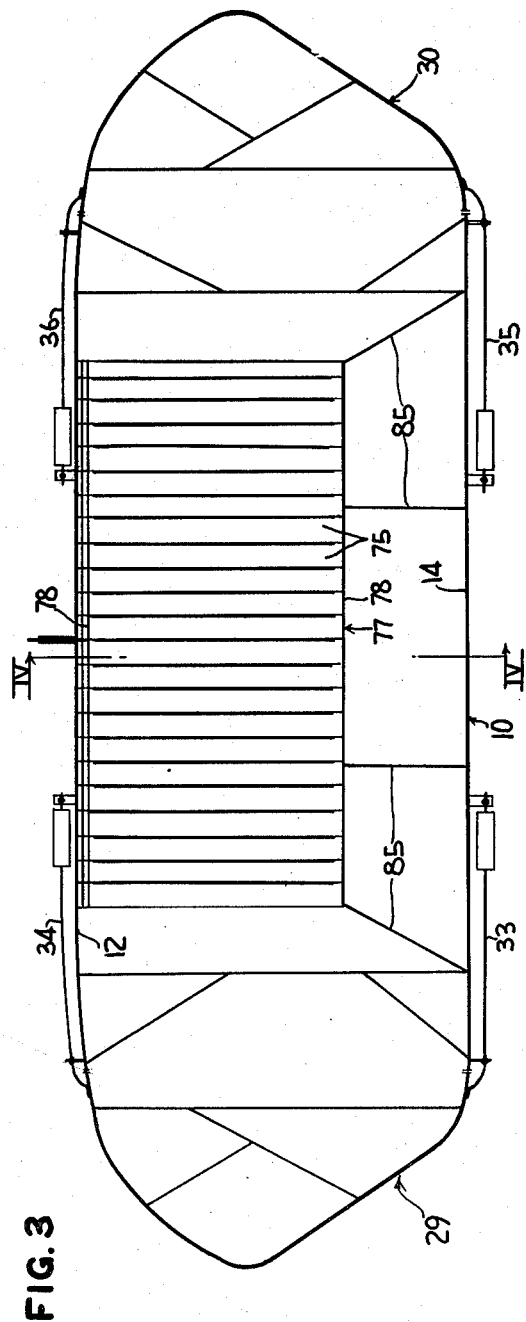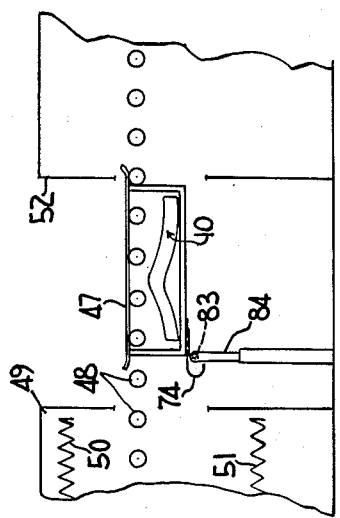

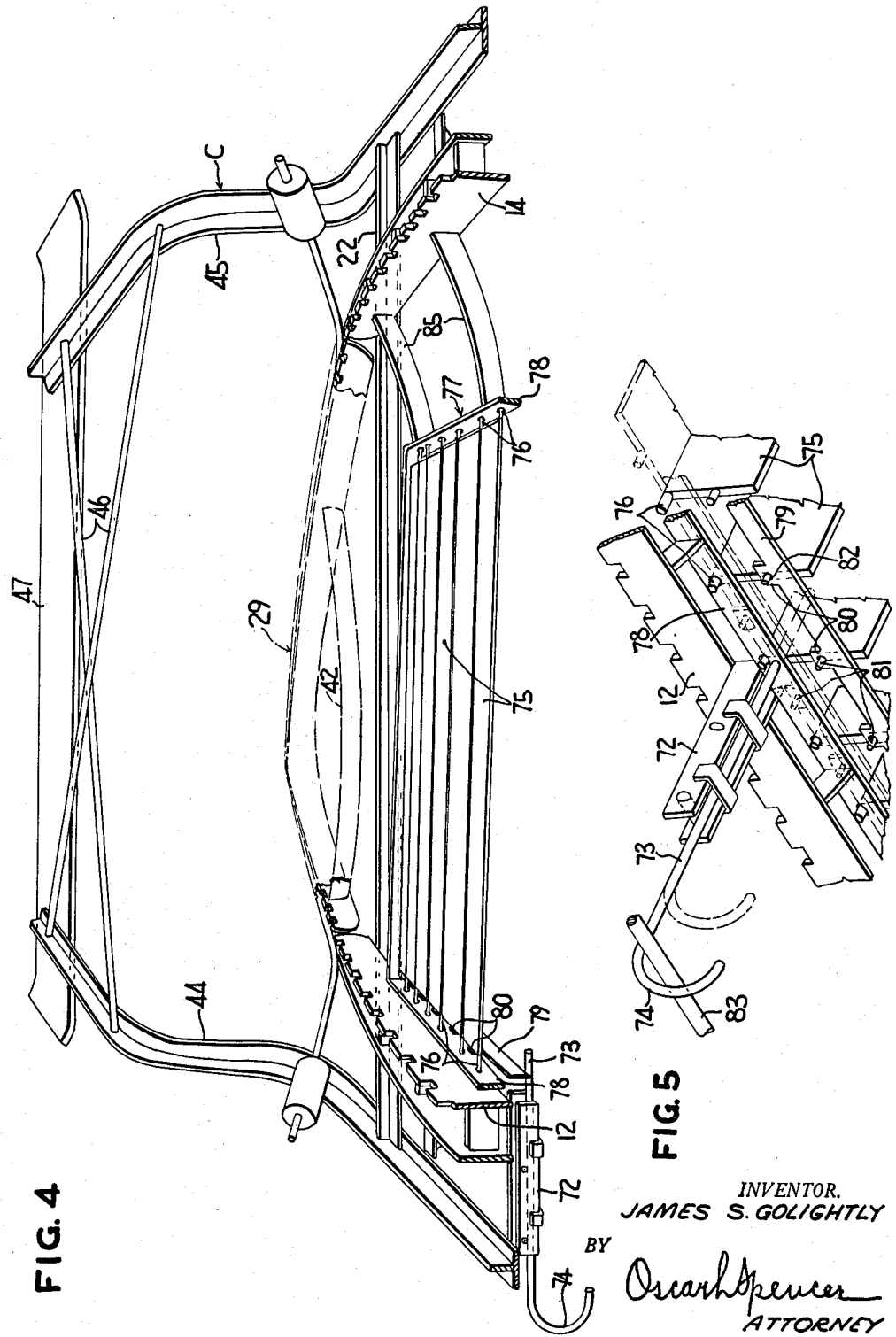

3,163,514
Patented Dec. 29, 1964

3,163,514
GLASS BENDING APPARATUS
James S. Golightly, Pittsburgh, Pa., assignor to Pittsburgh Plate Glass Company, Pittsburgh, Pa., a corporation of Pennsylvania
Filed Nov. 30, 1960, Ser. No. 72,687
8 Claims. (Cl. 65—288)

This invention relates to treating glass sheets and particularly relates to a glass bending mold adapted to bend a glass sheet in a hot atmosphere, particularly to a compound curvature involving a longitudinal bend and a transverse bend, said transverse bend comprising a relatively flat area portion and a bent area portion.

Glass sheets are bent by exposing them to elevated temperatures while supported above the skeleton shaping surface of a bending mold. After the glass sheets conform to the mold shaping surface, they are cooled. Portions of the glass sheet have their heating rate retarded by employing large masses of metal or other material of high thermal capacity adjacent thereto during the exposure to elevated temperatures. These glass sheet portions remain relatively flat while other portions soften and bend.

The present application is concerned with molds particularly suitable for producing bent and tempered glass sheets having certain areas bent sharply while other areas are maintained relatively flat, but is also useful in bending glass sheets to such shapes and subsequently annealing the bent sheets. The present invention produces such a result by providing a skeleton bending mold whose periphery encompasses a shaping surface with a heat absorbing member of special construction aligned with a relatively flat area portion included within the mold shaping surface. The heat absorbing member constructed according to the present invention remains attached to the mold throughout the heating and cooling steps that constitute a bending operation or a bending and tempering operation, but is so constructed that it occupies a position where it is capable of retarding the heating rate of a portion of a flat glass sheet occupying a relatively flat area portion of the shaping surface during the heating step and is pivotable into a position where it permits the glass sheet surface to be exposed to the cooling atmosphere after the bend is completed.

Glass bending techniques involve exposing the skeletonized mold supporting one or more flat glass sheets thereon to glass softening temperatures until the glass conforms to the mold shaping surface followed by a cooling operation. Rapid cooling follows if the bent glass is desired to be tempered. Cooling is controlled at a relatively slow cooling rate if the glass is to be annealed. The presence of the heat absorber member in close adjacency to its relatively flat area portion modifies the cooling pattern in adjacent regions of the glass. This modification tends to impose stresses which are not desired in the glass. These stresses weaken the glass structurally and may result in breakage during the glass fabrication process or breakage in the field after the glass is installed. Hence, the present invention also has utility in molds for bending glass sheets to complex curvatures even wherein the bent glass is not tempered after bending.

According to a particular embodiment of the present invention, molds are provided with one or more novel heat absorber members, each located in alignment with a flat area portion of the mold shaping surface. The heat absorber members selectively absorb a relatively large proportion of the heat which would otherwise be used to soften an adjacent portion of the glass sheet desired to be maintained relatively flat during the heating phase of the bending cycle.

The novel heat absorber member according to this invention comprises a plurality of Venetian blind louvers aligned with and spaced from the relatively flat area portion of the shaping surface of the glass bending mold. The louvers are positioned so as to face a surface of the glass sheet when supported on the shaping surface. Means are operatively connected to the louvers and the mold for rotating the louvers between a horizontal position substantially parallel to said flat area portion and a vertical position substantially normal to said flat area portion. According to the present invention, the Venetian blind louvers are oriented substantially parallel to the flat area portion of the shaping surface during the heating phase of the bending cycle and oriented substantially normal to the flat area portion of the shaping surface during the cooling phase following the bending step.

According to one embodiment of the present invention, the Venetian blind louvers are operatively connected to a pivotable section of a sectionalized mold. The pivotable mold section pivots between an open position for supporting a flat glass sheet preparatory to bending and a closed mold position wherein the mold sections form a substantially continuous shaping surface conforming in elevation and outline to the shape of the flat glass sheet. The operative connection between the Venetian blind louvers and the pivotable mold section causes the louvers to occupy a position substantially parallel to the flat area portion of the shaping surface when the pivoted mold section is pivoted to its open position. Also, the Venetian blind louvers are caused to pivot into positions substantially normal to the flat area portion in response to the pivotable mold section pivoting into the closed mold position.

In another embodiment of the present invention, a locking device is employed to lock the louvers in a position wherein they are oriented substantially parallel to the flat area portion of the shaping surface. A tripping mechanism is located along the path of movement of the mold and engages the locking mechanism to unlock the louvers and permit them to rotate into positions substantially normal to the flat area portion of the mold shaping surface. The tripping mechanism is located beyond the portion of the conveyor in which the glass is bent and before the location at which the bent glass is cooled.

Prior art devices have employed shields that were retracted from the mold before the glass was quenched. Such molds have to be rebuilt by replacing the shields. In both embodiments of the present invention, it is unnecessary to replace the heat absorber members onto the mold structure to prepare the mold for a subsequent bending operation.

Prior art bending molds incorporating permanently attached heat absorbing members have either employed heat absorbing members that remained fixed in position relative to the mold shaping surface or had their orientation relative to the mold shaping surface maintained substantially uniform throughout the bending cycle. Such heat absorbing members perform the function of maintaining an adjacent glass sheet portion relatively flat adequately, but also interfere with the access of air or quenching fluid onto the surface of the bent sheet and retard the cooling rate of the adjacent portion. This interference with cooling results in establishing the undesirable stresses mentioned above.

The present invention is intended for use with skeletonized molds which may be of either unitary construction (wherein the shaping surface is an endless ring) or of sectionalized construction. The latter construction is necessary when the glass is bent into sharp, complex bends.

In employing such molds, glass sheets are loaded onto the upper shaping surfaces of the molds and transported on a conveyor through a heating zone in which the glass is gradually heated to the glass softening point and conforms by gravity sagging onto the upper shaping surface of the mold. During the heating portion of the bending cycle, the novel heat absorber member, by being oriented substantially parallel to the flat area portion of the shaping surface, retards the heating of the portion of the glass sheet in alignment therewith by abstracting heat from the atmosphere in its vicinity. This promotes a non-uniform bend in the glass sheet with the portion adjacent the heat absorber member being maintained relatively flat while other portions of the glass sheet are being bent.

Upon completion of the bending and while the glass is still supported on the shaping surface, the orientation of the louvers is pivoted from a position substantially parallel to that of the flat area portion of the shaping surface to one substantially normal to said flat area portion. Thus, air is permitted to circulate onto the relatively flat area portion of the glass sheet adjacent the novel heat absorber member. The unique combination of orientation of the louvers comprising the heat absorber member substantially parallel to the flat area portion of the shaping surface during the heating phase of the bending cycle and the orientation of the louvers substantially normal to the flat area portion of the shaping surface during the cooling phase of the bending cycle permits the glass to be bent to non-uniform shapes and subsequently tempered or annealed without impairing the desired stress pattern imparted to the bent sheet.

Embodiments illustrating the present invention are shown in the accompanying drawings wherein like reference characters refer to like structural elements. In the drawings, FIG. 1 is a plan view of one embodiment of a mold provided with a heat absorber member conforming to the present invention;

FIG. 2 is a fragmentary sectional view taken along lines II—II of FIG. 1 showing the louvers of the heat absorber member in one position in phantom and in another position in bold lines;

FIG. 3 is a schematic plan view of a mold depicting an alternate embodiment;

FIG. 4 is a cross-sectional view of the mold of FIG. 3 taken along the lines IV—IV thereof, except that it shows the mold in the open position rather than the closed position;

FIG. 5 is a fragmentary detailed perspective view of a locking device employed to lock the louvers in one position depicted in phantom and showing the locking device in its unlocked position in full lines; and FIG. 6 is a longitudinal sectional view of a portion of a conveyor extending through a heating furnace and a tempering chamber illustrating a tripping mechanism for unlocking the locking device depicted in the embodiment of FIGS. 3 to 5.

With special reference to the drawings described hereinabove, reference number 10 refers generally to the center section of a skeletonized sectionalized mold having laterally spaced, longitudinally extending, edgewise-disposed center section rails 12 and 14 whose notched upper edges 16 and 18, respectively, form the longitudinally extending sides of the skeletonized shaping surface. Vertical posts 19 and 20 interconnect center section rail 12 to cross beams 21 and 22 adjacent the longitudinal extremities of center section rail 12. Similar vertical posts 23 and 24 interconnect the longitudinal extremities of center section rail 14 with cross beams 21 and 22, respectively. Cross beams 21 and 22 support hinge brackets which receive hinges 25, 26, 27, and 28, the purpose of which will be described later.

End mold sections 29 and 30 flank the longitudinal extremities of the center mold section 10. End mold section 29 is in the form of an edgewise-disposed curved rail having an upper shaping surface 31. End mold section 30 is substantially the mirror image of end mold section 29 and is provided with an upper shaping surface 32.

Weighted arms 33 and 34 extend longitudinally inwardly and laterally outwardly from the inner extremities of end mold section 29. Similar weighted arms 35 and 36 extend generally longitudinally inwardly and laterally outwardly from the inner ends of end mold section 30.

Arm 33 is pivoted to hinge 25, and arm 34 is pivoted to hinge 27 to provide an axis of rotation for end mold section 29 relative to one longitudinal end of the center mold section 10. Similarly, arm 35 is pivoted to hinge 26 and arm 36 to hinge 28 to provide a pivot axis for end mold section 30 relative to the other longitudinal end of center mold section 10. The axes of rotation provided by the hinges 25 to 28, inclusive, permit arms 33 to 36, inclusive, to rotate in vertical planes.

Stop members 37, 38, 39, and 40 are positioned in the rotational paths taken by weighted arms 33, 34, 35, and 36, respectively. When the weighted arms rotate downwardly to lift the end mold sections upwardly into the closed mold position, the arms contact the stop members and the mold sections 10, 29 and 30 are in a closed mold position wherein their upper surfaces form a substantially continuous shaping surface conforming in elevation and outline to the shape desired for the bent glass sheet.

Additional cross bracing such as bracing rod 41 interconnecting the center of rails 14 and 16 and bracing rods 42 and 43 interconnecting the longitudinally inner extremities of end mold sections 29 and 30 may be provided to improve the structural rigidity of the skeletonized mold, if needed.

Cross beams 21 and 22 are normally received in a skeleton carriage C (FIG. 4). The latter comprises a pair of laterally spaced longitudinally extending angle irons 44 and 45 having a shape that is similar to the elevation of the mold in its closed position.

The angle irons 44 and 45 are interconnected by rods 46 beyond the mold extremities. A sled 47 interconnects the opposite longitudinal extremities of angle irons 44 and 45 to each other at each end of the carriage.

The weights on the weighted arms 33 to 36 are sufficient to rotate the end mold sections 29 and 30 into the closed mold position. However, the weight of one or more rigid, flat glass sheets having a nominal thickness of one-quarter inch is sufficient to overcome the urging force applied by the weighted arms tending to rotate end mold sections 29 and 30 into the closed mold position. Thus, in loading a glass sheet for bending, end mold sections 29 and 30 are pivoted outwardly into a spread mold position to receive one or more flat glass sheets preparatory to bending. The rigid, flat glass sheet rests on the longitudinally outer extremities of the end mold sections 29 and 30 and also on the longitudinal extremities of center section shaping rails 12 and 14 until it is softened by exposure to heat. The force applied by the weighted arms is then sufficient to rotate the end sections into the closed mold position and fold the ends of the heat-softened sheet upwardly. The sheet sags downwardly between its points of support to conform to the shaping surface.

The sleds 47 ride on stub rolls 48 of a conveyor as shown in FIG. 6. When the glass is bent and tempered, the stub roll conveyor 48 extends sequentially through a tunnel-like furnace 49 provided with heating elements 50 and 51 and a tempering apparatus 52. The latter is preferably of the type depicted in U.S. Patent No. 2,790,270 to James M. Freiberg.

The mold construction described hereinabove is typical of sectionalized skeletonized molds used to bend and temper glass sheets prior to the present invention. The following description will acquaint the reader with the novel heat absorber construction of the present invention.

In one embodiment thereof, a substantially rectangular frame 53 is used to support the novel heat absorber member. The frame comprises a longitudinally extending side bar 54 disposed edgewise and a pair of apertured cross bars 55 and 56 extending laterally from the longitudinal extremities of longitudinally extending side bar 54 to attachments 57 and 58 extending downwardly from center section rail 12. The substantially rectangular frame 53 supports a plurality of louvers 59, 60, and 61.

The louvers are pivotally supported between aligned apertures in the apertured cross bars 55 and 56. Each louver has a stub pivot extension 62 attached to one end and extending through an aperture of cross bar 56. The other end of each louver contains a crank 63 having a portion aligned with stub pivot extension 62 extending through an aperture in apertured cross bar 55 aligned with an aperture in cross bar 56.

The offset portion of each crank 63 is received in one of a plurality of apertures of an elongated apertured bar 64. The latter, in turn, is pivotally attached to the inner end of a link 65.

The outer end of link 65 is pivotally attached to a pie-slice shaped plate 66. A small weight 67 is attached to the inner portion of plate 66. Plate 66 is pivotally attached to a bar 68 which extends laterally outwardly from center section rail 12. A bearing 69 is provided for this purpose.

Plate 66 is provided with an outer edge surface 70 that is pivotally urged upwardly into contact with weighted arm 33 by virtue of the fact that the small weight 67 lies inwardly of the bearing 69 about which plate 66 pivots. Therefore, when the mold is in its open position, weighted arm 33 is elevated to permit plate 66 to pivot into position depicted in phantom in FIG. 2. This pulls the link 65 laterally outwardly of the mold, thus causing apertured bar 64 to follow and rotate the cranks 63 to rotate louvers 59, 60, and 61 into a substantially horizontal position which is substantially parallel with the relatively flat area portion of the shaping surface enclosed by the mold sections 10, 29, and 30 and above the frame 53.

When a glass sheet supported by the sectionalized mold is softened by heat, the weighted arms 33 through 36 cause the end mold sections 29 and 30 to rotate upwardly. This upward rotation of the end mold sections is accompanied by a downward movement of the weighted arms as the mold moves toward its closed mold position. Downward movement of the weight arm 33 in contact with edge surface 70 urges plate 66 to pivot inwardly of the mold, thereby urging link 65 to move laterally inwardly of the mold and forcing apertured bar 64 to move inwardly also.

The inwardly movement of apertured bar 64 causes the cranks 63 to rotate, thus pivoting the louvers 59, 60, and 61 into a substantially vertical position such as depicted in the solid lines in FIG. 2. This latter position enables the glass to be exposed directly to currents of air used to chill the glass.

Thus, it will be seen that the orientation of louvers 59, 60, 61 in the embodiment depicted in FIGURES 1 and 2 is responsive to the pivoting of the end mold sections 29 and 30 between the open mold position and the closed mold position. Therefore, the portion of the glass sheet located immediately above the novel heat absorber member encompassed within the frame 53 has its heating rate relatively retarded by virtue of the selective abstraction of the atmospheric heat from the vicinity of the glass sheet adjacent thereto. Also, by virtue of the rotation of louvers 59, 60, and 61 responsive to the movement of the mold into the closed mold position which accompanies the bending of the glass sheet, the heat absorber member of the present invention does not interfere with the cooling of the glass sheet subsequent to bending.

In a particularly effective embodiment of the present invention, louvers of stainless steel 3/16 inch thick located about two inches below the mold shaping surface in the horizontal orientation have been successfully employed.

In the above embodiment of the invention, frame 53 and stub pivot extensions 62 serve as means attached to the mold for pivotally supporting the louvers to the mold and the cranks 63, apertured bar 64, link 65, plate 66, weight 67, bar 68, hinge 69 and weight arm 33 cooperate to serve as means operatively connected to said louvers and said mold for rotating the louvers.

In the embodiment of the present invention, a bracket 72 is attached to the undersurface of mold rail 12 and a slide bar 73 extends through the bracket. Slide bar 73 is provided with a hook 74 at one extremity thereof.

In this embodiment each louver 75 has two aligned stub rods 76 rigidly attached to the end edge portions thereof. Each louver extends completely across the frame 77 between side bars 78 extending longitudinally of the frame.

An additional bar 79 having a plurality of apertured lugs 80 is pivotally attached to stub rods 81 that extend outwardly from one end edge of each louver 75 and through apertures 82 of the apertured lugs 80. The slide bar 73 serves as lock means maintaining the louvers of the latter embodiment in horizontal position when it is slid inwardly in the position underneath the bottom edge of bar 79.

The mold traverses a conveyor 48, which extends successively through a furnace 49 and a tempering apparatus 52 (FIG. 6). A cross bar 83 mounted on a support 84 is located in the path of movement taken by the hook end 74 of slide bar 73. When the hook end 74 engages cross bar 83, the slide bar 73 moves outwardly along bracket 72 to the solid line position of FIG. 5. This permits the bar 79 to rotate the louvers or slats 75 from their locked position, which was substantially parallel to the flat area portion of the shaping surface into a position substantially normal to the flat area portion of the shaping surface encompassed by the mold sections 10, 29, and 30. Thus, in the latter embodiment, stub rods 76 and frame 77 cooperate as means attached to the mold for pivotally supporting louvers 75 to the mold and bar 79, its lugs 80, stub rods 81 and apertures 82 serve as means operatively connected to said louvers and said mold for pivoting said louvers.

In the latter embodiment, the frame 77 encompasses a much larger area than that encompassed by the frame 53 of the first embodiment. Hence, its larger size requires additional braces 85 to secure the frame 77 to the center section 10.

If it is desired to have a graduated heat-absorbing effect between the flat area portion and the bent portion, louver 61 can be constructed of less thickness than that of louver 60 and louver 60 of less thickness than louver 59. For example, the louvers may be decreased in thickness from louver 59 to louver 61 from three-sixteenths inch for louver 59 to one-eighth inch for louver 61. Also, in the embodiment depicted in FIG. 4, the louvers 75 may be constructed of a thickness of three-sixteenths inch for the central louvers and gradually diminishing in thickness to one-eighth inch for the louvers farthest removed from the longitudinal center of the mold. A graduated, heat-absorbing effect may also be obtained by utilizing apertured heat absorbers such as screens or expanded metal instead of solid plates for louver 61 combined with solid louvers 60 and 59 or any combination of solid and apertured louvers needed for the desired effect. In all instances, all the louvers operate simultaneously, being actuated either by the rotation of the end mold sections 29 and 30 or by the unlocking of the locking means such as slide bar 73 and by the tripping means such as the bar 79.

Various embodiments of the present invention have been described for purposes of illustration rather than limitation. Reference to the latter may be obtained from the claimed subject matter which follows.

What is claimed is:

1. A glass bending mold adapted to bend a glass sheet in a hot atmosphere and comprising an upper skeleton shaping surface conforming in elevation and outline to the shape of the bent glass sheet, said shaping surface enclosing a relatively flat area portion and a relatively curved area portion, a heat absorbing member comprising a plurality of Venetian blind louvers aligned with and spaced from said relatively flat area portion and positioned so as to face a surface of the glass sheet when supported on said shaping surface, means attached to said mold for pivotally supporting said louvers to said mold, and means operatively connected to said louvers and said mold for rotating said louvers between a horizontal position substantially parallel to said relatively flat area portion and a vertical position substantially normal to said relatively flat area portion.

2. A glass bending mold as in claim 1, wherein the louvers are located below the mold shaping surface.

3. A glass bending mold as in claim 1, wherein the louvers are of different thicknesses.

4. A glass bending mold as in claim 1, wherein the louvers comprise at least one solid metal slat and at least on perforated metal slat.

5. A skeletonized glass bending mold adapted to bend a glass sheet in a hot atmosphere and comprising a first skeletonized mold section and an additional skeletonized mold section, means pivotally connecting said additional mold section to said first mold section for movement between an open mold position and a closed mold position, each mold section having an upper surface forming part of a mold shaping surface in the closed mold position, said mold shaping surface including a relatively flat area portion enclosed within said first mold section, a heat absorbing member comprising a plurality of Venetian blind louvers aligned with and spaced from said relatively flat area portion and positioned so as to face a surface of the glass sheet when supported on said shaping surface, and means operatively responsive to movement of said additional mold section between an open mold position and a closed mold position to cause said louvers to selectively pivot between a substantially horizontal position and a substantially vertical position.

6. A glass bending mold as in claim 5, further including a third skeletonized mold section located beyond the opposite end of said first mold section from that occupied by said additional mold section and means pivoting said third mold section to said first mold section.

7. A glass bending mold adapted to bend a glass sheet to a complex curvature including a longitudinal bend and a transverse bend, said transverse bend comprising a relatively flat area portion and a bent area portion, said mold comprising a central mold section comprising a pair of longitudinally extending shaping rails, an end mold section comprising a curved rail pivotally attached to each end of said central mold section for movement between an open mold position and a closed mold position, each mold section having an upper surface, said upper surfaces comprising an upper shaping surface conforming in elevation and outline to the shape of the bent glass sheet in the closed mold position and enclosing a relatively flat area portion located laterally inwardly of one of said longitudinally extending shaping rails, a frame attached to said one longitudinally extending shaping rail, a heat absorbing member aligned with and spaced from said flat area portion and positioned so as to face a surface of the glass sheet when supported on said shaping surface, said heat absorbing member comprising a plurality of Venetian blind louvers pivotally attached to said frame, and means operatively responsive to movement of one of said end mold sections between an open mold position and a closed mold position to cause said louvers to selectively pivot between a substantially horizontal position and a substantially vertical position.

8. Apparatus for bending a glass sheet in a hot atmosphere and subsequently cooling the bent sheet comprising a tunnel-like furnace, a tunnel-like cooling chamber, a conveyor extending successively through said furnace and said cooling chamber, a skeleton glass bending mold adapted to bend a glass sheet in a hot atmosphere and comprising an upper skeletonized shaping surface conforming in elevation and outline to the shape of the bent glass sheet, said shaping surface enclosing a relatively flat area portion, a heat absorbing member comprising a plurality of Venetian blind louvers aligned with and spaced from said relatively flat area portion and positioned so as to face a surface of the glass sheet when supported on said shaping surface, means supporting said mold for movement along said conveyor, means operatively connected to said Venetian blind louvers for locking them in a substantially horizontal position, means located along said conveyor in the path of travel of said locking means for removing said locking means from said louver locking position, and means operatively connected to said louvers to cause the louvers to rotate into substantially vertical positions when said locking means is removed from its louver locking position.

References Cited in the file of this patent
UNITED STATES PATENTS

| | | |
|---|---|---|
| 2,876,595 | Golightly et al. | Mar. 10, 1959 |
| 2,977,720 | Carson et al. | Apr. 4, 1961 |